US009272788B2

(12) United States Patent
Truemper et al.

(10) Patent No.: US 9,272,788 B2
(45) Date of Patent: Mar. 1, 2016

(54) AIRCRAFT COOLING SYSTEM AND METHOD FOR OPERATING AN AIRCRAFT COOLING SYSTEM

(71) Applicant: Airbus Operations GmbH, Hamburg (DE)

(72) Inventors: Torsten Truemper, Hamburg (DE); Matthias Reiss, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 150 days.

(21) Appl. No.: 14/243,067

(22) Filed: Apr. 2, 2014

(65) Prior Publication Data
US 2014/0298824 A1    Oct. 9, 2014

(30) Foreign Application Priority Data

| Apr. 3, 2013 | (DE) | ............................ 10 2013 005 595 |
| Apr. 3, 2013 | (DE) | ............................ 10 2013 005 596 |
| Jun. 14, 2013 | (DE) | ............................ 10 2013 211 177 |

(51) Int. Cl.
| *B64D 13/08* | (2006.01) |
| *F25B 21/04* | (2006.01) |
| *B64D 13/06* | (2006.01) |

(52) U.S. Cl.
CPC ............... *B64D 13/08* (2013.01); *B64D 13/06* (2013.01); *F25B 21/04* (2013.01); *B64D 2013/0629* (2013.01); *Y02B 30/52* (2013.01)

(58) Field of Classification Search
CPC .................. B64D 13/08; B64D 13/06; B64D 2013/0629; F25B 21/04; Y02B 30/52
USPC .................................... 62/3.3, 3.7, 113, 324.1
See application file for complete search history.

(56) References Cited

U.S. PATENT DOCUMENTS

| 4,430,867 | A | * | 2/1984 | Warner | .................... B60H 1/32 62/172 |
| 5,086,622 | A | * | 2/1992 | Warner | .................. B64D 13/06 62/172 |

(Continued)

FOREIGN PATENT DOCUMENTS

| CN | 101495372 | 7/2009 |
| DE | 4340317 | 6/1995 |

(Continued)

OTHER PUBLICATIONS

Chinese Office Action, Sep. 1, 2015.

(Continued)

*Primary Examiner* — Mohammad M Ali
(74) *Attorney, Agent, or Firm* — Greer, Burns & Crain Ltd.

(57) ABSTRACT

An aircraft cooling system including a cooler having a cold transfer circuit, in which a cold transfer medium circulates. The cooler supplies cooling energy to an aircraft device to be cooled. The aircraft cooling system further includes a heat transfer arrangement having a heat transfer circuit, in which a heat transfer medium circulates and which is thermally coupled to the cold transfer circuit of the cooler via a heat exchanger, in order to absorb waste heat generated by the cooler and transfer it to a cabin air extraction system. The heat transfer arrangement further includes at least one heat pump which brings about an increase of the heat energy transfer from the cold transfer medium circulating in the cold transfer circuit of the cooler to the heat transfer medium circulating in the heat transfer circuit, at least in certain operating phases of the aircraft cooling system.

20 Claims, 3 Drawing Sheets

(56) References Cited

U.S. PATENT DOCUMENTS

| | | | | |
|---|---|---|---|---|
| 5,385,020 | A * | 1/1995 | Gwilliam | B64F 1/362 62/190 |
| 5,513,500 | A | 5/1996 | Fischer et al. | |
| 6,381,973 | B1 * | 5/2002 | Bhatti | B60H 1/00007 62/172 |
| 7,757,502 | B2 * | 7/2010 | Merritt | B64D 13/06 417/405 |
| 7,775,447 | B2 * | 8/2010 | Scherer | B64D 13/00 165/203 |
| 7,802,732 | B2 | 9/2010 | Scherer et al. | |
| 7,870,892 | B2 * | 1/2011 | Gawthrop | B60H 1/004 165/202 |
| 8,118,257 | B2 * | 2/2012 | Wilmot, Jr. | B64D 13/06 244/118.5 |
| 8,336,329 | B2 * | 12/2012 | Uluc | B64D 13/00 62/407 |
| 8,713,950 | B2 * | 5/2014 | Roering | B64D 13/06 62/113 |
| 8,959,937 | B2 * | 2/2015 | Piesker | F25B 23/006 165/104.11 |
| 2004/0195447 | A1 | 10/2004 | Claeys | |
| 2006/0060712 | A1 * | 3/2006 | Hoffjann | B64D 11/02 244/136 |
| 2007/0236881 | A1 * | 10/2007 | Harder | H05K 7/202 361/695 |
| 2008/0087039 | A1 | 4/2008 | Reed et al. | |
| 2009/0000329 | A1 | 1/2009 | Colberg et al. | |
| 2009/0211273 | A1 | 8/2009 | Klewer | |
| 2011/0005244 | A1 | 1/2011 | Finney et al. | |
| 2012/0322354 | A1 | 12/2012 | Andres | |

FOREIGN PATENT DOCUMENTS

| | | |
|---|---|---|
| DE | 10361709 | 8/2005 |
| DE | 102006005035 | 9/2007 |
| DE | 102012006628 | 10/2013 |
| EP | 1701884 | 9/2006 |
| EP | 1801009 | 6/2007 |
| EP | 1979233 | 10/2008 |
| EP | 2272757 | 1/2011 |
| WO | 2005030579 | 4/2005 |
| WO | 2012095646 | 7/2012 |

OTHER PUBLICATIONS

German Search Report, Apr. 3, 2013 (102013005595.4).

German Search Report, Apr. 3, 2013 (102013005596.2).

* cited by examiner

AIRCRAFT COOLING SYSTEM AND METHOD FOR OPERATING AN AIRCRAFT COOLING SYSTEM

CROSS-REFERENCES TO RELATED APPLICATIONS

This application claims the benefit of the German patent application No. 102013005596.2 filed on Apr. 3, 2013, the German patent application No. 102013005595.4 filed on Apr. 3, 2013, and the German patent application No. 102013211177.0 filed on Jun. 14, 2013, the entire disclosures of which are incorporated herein by way of reference.

BACKGROUND OF THE INVENTION

The invention relates to an aircraft cooling system and to a method for operating an aircraft cooling system.

In modern commercial aircraft, normally at least one device to be cooled is provided in the area of a galley. The device to be cooled may be, for example, a trolley or a galley area which serves, for example, for storing food intended for distributing to the aircraft passengers. A galley device to be cooled can be supplied with cooling energy by means of a decentralized cooler assigned to the galley. The decentralized cooler may be, for example, configured in the form of an air chiller and be designed for operating with a two-phase coolant, i.e., a coolant which is converted from the liquid to the gaseous state when delivering cooling energy to the device to be cooled. The coolant of the air chiller delivers its cooling energy to an air flow which is blown into the galley device to be cooled after flowing through the air chiller.

Alternatively to this, the decentralized cooler may be configured in the form of an electrically operated refrigerator which generates cooling energy by means of an integrated refrigeration circuit and delivers it to the galley device to be cooled. Both a decentralized cooler configured in the form of an air chiller and a decentralized cooler configured in the form of a refrigerator generate waste heat in operation. This waste heat is released into the surroundings of the cooler, i.e., conducted into the aircraft cabin and must finally be removed from the aircraft cabin by means of the aircraft air conditioning system.

Furthermore, it is known, for example from DE 43 40 317 C2 and U.S. Pat. No. 5,513,500 or from EP 1 979 233 A1 and US 2009/000329 A1, to cool galley devices, such as, for example, trolleys or galley compartments filled with food by cooling stations which are arranged in the galley areas and supplied with cooling energy from a central cold-generating device. The cooling stations are connected via a cold transfer circuit to the decentralized cold-generating device, in which a liquid or a two-phase cold transfer medium circulates. The waste heat of a cooling system equipped with cooling stations and a central cold-generating device is normally delivered via a heat exchanger to ram air flowing through a ram air duct of the aircraft.

SUMMARY OF THE INVENTION

The object on which the invention is based is to provide an aircraft cooling system and a method for operating an aircraft cooling system which enable an energy-efficient cooling of a device to be supplied with cooling energy on board an aircraft.

An aircraft cooling system according to the invention comprises a cooler having a cold transfer circuit, in which a cold transfer medium circulates. The cooler is adapted to supply cooling energy to an aircraft device to be cooled. The cooler may be an air chiller or an electrically operated refrigerator which, for example, supplies cooling energy to a galley device to be cooled. The galley device to be cooled may be, for example, a compartment of the galley which serves for storing food intended for distributing to the aircraft passengers. In particular when the cooler is configured in the form of an air chiller, the cooler may be designed for operating with a two-phase cold transfer medium, i.e., a cold transfer medium which is converted from the liquid to the gaseous state when delivering cooling energy to the device to be cooled. Alternatively to this, the cooler may be equipped with Peltier elements for cooling energy generation.

The cooler generates waste heat in operation. When the cooler is operated with a two-phase cold transfer medium, the two-phase cold transfer medium, which is in the gaseous state after delivering cooling energy to the device to be cooled, must be converted back to the liquid state again by heat energy transfer to an appropriate medium. The aircraft cooling system therefore comprises a heat transfer arrangement which is adapted to absorb waste heat generated by the cooler and transfer it to a cabin air extraction system. The cabin air extraction system normally serves to remove bad odours from the aircraft cabin into the aircraft surroundings. Furthermore, by removing cabin exhaust air from the aircraft cabin by means of a conventional cabin air extraction system, waste heat delivered into the aircraft cabin by heat-generating components arranged in the aircraft cabin is necessarily also removed from the aircraft cabin.

The heat transfer arrangement comprises a heat transfer circuit, in which a heat transfer medium circulates. The heat transfer circuit is thermally coupled to the cold transfer circuit of the cooler via a heat exchanger, so that when flowing through the heat exchanger the cold transfer medium circulating in the cold transfer circuit of the cooler can deliver heat energy to the heat transfer medium circulating in the heat transfer circuit. The heat exchanger may be formed, for example, by a condenser assigned to the cooler, which serves to convert a cold transfer medium circulating in the cold transfer circuit of the cooler from the gaseous state to the liquid state while delivering heat energy. The heat transfer medium circulating in the heat transfer circuit then transfers the heat energy to the cabin air extraction system. The heat transfer arrangement consequently produces, via the heat transfer circuit or the heat transfer medium circulating in the heat transfer circuit, a very effective thermal coupling between the waste heat-generating cooler and the cabin air extraction system.

The aircraft cooling system thus enables an energy-efficient removal of the waste heat of the cooler from the aircraft cabin. As a result, it is no longer necessary to remove the waste heat generated by the cooler to the aircraft surroundings with the aid of the aircraft air conditioning system or an additional cooling system, so that the aircraft air conditioning system can be relieved or the ram air requirement of the additional cooling system reduced. This enables, in the operation of an aircraft equipped with the aircraft cooling system, fuel savings to be achieved.

The heat transfer arrangement may comprise, for example, a heat exchanger which is adapted to bring the heat transfer medium heated by the waste heat of the cooler into thermal contact with cabin exhaust air flowing through a cabin exhaust air line of the cabin air extraction system. The heat exchanger of the heat transfer arrangement can then consequently be configured in the form of a liquid/air heat exchanger which enables a particularly efficient heat energy transfer from the liquid heat transfer medium flowing through the heat transfer circuit to the cabin exhaust air flowing through the cabin exhaust air line of the cabin air extraction system.

Finally, the heat transfer arrangement of the aircraft cooling system comprises a heat pump which is adapted to bring about an increase of the heat energy transfer from the cold transfer medium circulating in the cold transfer circuit of the cooler to the heat transfer medium circulating in the heat transfer circuit, at least in certain operating phases of the aircraft cooling system. The heat pump thus makes it possible, if required, for additional heat which is not already transmitted, by the thermal coupling of the heat transfer circuit of the heat transfer arrangement to the cold transfer circuit of the cooler by means of the heat exchanger, from the cold transfer medium circulating in the cold transfer circuit of the cooler to the heat transfer medium circulating in the heat transfer circuit, to be transferred from the cold transfer medium circulating in the cold transfer circuit of the cooler to the heat transfer medium circulating in the heat transfer circuit.

Through this additional heat removal from the cold transfer medium circulating in the cold transfer circuit of the cooler, in the case of a cooler operated with a two-phase cold transfer medium, the pressure difference between an evaporator side and a condenser side of the cold transfer circuit is reduced and thus the efficiency of the cooler is increased. Furthermore, if required, with the aid of the heat pump, the temperature of the heat transfer medium flowing through the heat transfer circuit before delivering its heat energy to the cabin air extraction system and consequently the temperature difference between the temperature of the heat transfer medium flowing through the heat transfer circuit before delivering its heat energy to the cabin air extraction system and the temperature of the cabin exhaust air serving as a heat sink can be increased. As a result, the heat removal from the cooler can be improved, for a constant heat absorption capacity of the cabin air extraction system, and consequently the cooling capacity of the cooler can be increased. As a result, an adequate performance of the aircraft cooling system can be ensured even in difficult conditions, for example when an aircraft equipped with the aircraft cooling system is on the ground on hot days.

Finally, the equipping of the aircraft cooling system with a heat pump makes it possible to dispense with an increase of the operating temperature of a condenser of a cooler operated with a two-phase cold transfer medium for increasing the temperature difference between the temperature of the heat transfer medium flowing through the heat transfer circuit and the temperature of the cabin exhaust air serving as a heat sink. As a result, a reduction of the operating efficiency of the cooler, resulting from an increase of the operating temperature of the condenser, and an increase of the heat energy to be removed by means of the cabin air extraction system can be avoided.

Preferably, the aircraft cooling system comprises a control device which is adapted to control the operation of the heat pump as a function of the temperature and/or the pressure of the cold transfer medium in the heat exchanger, which thermally couples the heat transfer circuit to the cold transfer circuit of the cooler. For example, sensor signals can be transmitted to the control device, which are characteristic of the temperature and/or the pressure of the cold transfer medium in the heat exchanger which thermally couples the heat transfer circuit to the cold transfer circuit of the cooler. For this, the liquid cooling system may be equipped with corresponding sensors.

The control device may in particular be adapted to put the heat pump into operation when the temperature of the cold transfer medium in the heat exchanger which thermally couples the heat transfer circuit to the cold transfer circuit of the cooler exceeds a predetermined threshold value and/or the pressure of the cold transfer medium in the heat exchanger which thermally couples the heat transfer circuit to the cold transfer circuit of the cooler falls below a predetermined threshold value. Furthermore, the control device may be adapted to control the operation of the heat pump in such a manner that the temperature and/or the pressure of the cold transfer medium in the heat exchanger which thermally couples the heat transfer circuit to the cold transfer circuit of the cooler is/are maintained in a predetermined range of values.

The heat pump may be integrated in the cooler. Furthermore, the control device for controlling the operation of the heat pump may also be integrated in the cooler. The heat pump and/or the control device then do not have to be mounted separately. Alternatively to this, it is, however, conceivable to form the heat pump separately from the cooler. Likewise, the control device may also be formed separately from the cooler. The heat pump and/or the control device is/are then easily accessible, for example for maintenance purposes.

The heat pump may be adapted, in operation, to thermally couple the heat transfer circuit to the cold transfer circuit of the cooler. In such a configuration of the aircraft cooling system, through the operation of the heat pump, a further thermal coupling of the heat transfer circuit of the heat transfer arrangement to the cold transfer circuit of the cooler can produced, via which, if required, additional heat which is not already transmitted, by the thermal coupling of the heat transfer circuit of the heat transfer arrangement to the cold transfer circuit of the cooler by means of the heat exchanger, from the cold transfer medium circulating in the cold transfer circuit of the cooler to the heat transfer medium circulating in the heat transfer circuit, can be transferred from the cold transfer medium circulating in the cold transfer circuit of the cooler to the heat transfer medium circulating in the heat transfer circuit.

Alternatively to this, the heat pump may be adapted, in operation, to thermally couple a first section of the heat transfer circuit to a second section of the heat transfer circuit. The first section of the heat transfer circuit is preferably arranged upstream of the heat exchanger which thermally couples the heat transfer circuit to the cold transfer circuit of the cooler. The second section of the heat transfer circuit is preferably arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system. The terms "upstream" and "downstream" here relate to the flow direction of the heat transfer medium through the heat transfer circuit of the heat transfer arrangement.

In such a configuration of the aircraft cooling system, through the operation of the heat pump, heat energy can be transmitted from the heat transfer medium, flowing through the heat transfer circuit upstream of the heat exchanger coupling the heat transfer circuit to the cold transfer circuit, to the heat transfer medium flowing through the heat transfer circuit downstream of the heat exchanger coupling the heat transfer circuit to the cold transfer circuit. As a result, the temperature of the heat transfer medium flowing through the second section of the heat transfer circuit before delivering its heat energy to the cabin air extraction system, and consequently the temperature difference between the temperature of the heat transfer medium flowing through the second section of the heat transfer circuit before delivering its heat energy to the cabin air extraction system and the temperature of the cabin exhaust air serving as a heat sink is increased.

Simultaneously, the temperature of the heat transfer medium flowing through the first section of the heat transfer circuit is reduced, so that the heat transfer medium can be supplied to the heat exchanger, which thermally couples the heat transfer circuit to the cold transfer circuit of the cooler, at a lower temperature. When flowing through the heat exchanger, the heat transfer medium can then absorb more heat energy from the cold transfer medium circulating in the cold transfer circuit of the cooler.

In principle, the aircraft cooling system may comprise only one heat pump. The heat pump can then, as described above, either be adapted to thermally couple the heat transfer circuit to the cold transfer circuit of the cooler or be adapted to thermally couple a first section, located upstream with respect to the heat exchanger, of the heat transfer circuit to a second section, located downstream with respect to the heat exchanger, of the heat transfer circuit. Alternatively to this, it is, however, also conceivable to equip the aircraft cooling system with a plurality of heat pumps. A first heat pump can then be adapted to thermally couple the heat transfer circuit to the cold transfer circuit of the cooler, while a second heat pump can be adapted to thermally couple a first section, located upstream with respect to the heat exchanger, of the heat transfer circuit to a second section, located downstream with respect to the heat exchanger, of the heat transfer circuit.

Besides the heat exchanger which thermally couples the heat transfer circuit to a cold transfer circuit of the cooler, there may be arranged in the heat transfer circuit a heat exchanger of the heat transfer arrangement which is adapted to bring the heat transfer medium heated by the waste heat of the cooler and/or the waste heat of the heat-generating aircraft device into thermal contact with the cabin exhaust air flowing through a cabin exhaust air line of the cabin air extraction system. The heat exchanger of the heat transfer arrangement can be configured in the form of a liquid/air heat exchanger which enables a particularly efficient heat energy transfer from the heat transfer medium flowing through the heat transfer circuit to the cabin exhaust air flowing through the cabin exhaust air line of the cabin air extraction system, when a liquid heat transfer medium flows through the heat transfer circuit.

Preferably, the heat exchanger of the heat transfer arrangement is arranged downstream of an extractor in the cabin exhaust air line of the cabin air extraction system. The term "downstream" here relates to the flow direction of the cabin exhaust air through the cabin exhaust air line. The extractor, which may contain one more filters, is consequently arranged, in the flow direction of the cabin exhaust air through the cabin exhaust air line, upstream of the heat exchanger of the heat transfer arrangement in the cabin exhaust air line and serves, in particular, to remove bad odors from the aircraft cabin. Through the arrangement of the heat exchanger of the heat transfer arrangement downstream of the extractor, the functioning of the extractor is not impaired by the heat exchanger of the heat transfer arrangement.

Preferably, the heat pump comprises at least one thermoelectric heat pump unit, in particular a Peltier element. A heat pump comprising a Peltier element increases the weight of the aircraft cooling system only by a comparatively small amount, yet the heat pump output produced by a Peltier element is sufficient to increase the difference, between the temperature of the cabin exhaust air flowing through a cabin exhaust air line of the cabin air extraction system and the temperature of the heat transfer medium circulating in the heat transfer circuit before delivering its heat energy to the cabin air extraction system, to the desired value or maintain it at the desired value, even when an aircraft equipped with the aircraft cooling system is on the ground on hot days.

A cold side of the Peltier element is preferably thermally coupled to the cold transfer circuit of the cooler. In particular, the cold side of the Peltier element may be thermally coupled to a cold transfer circuit of the cooler downstream of the heat exchanger which thermally couples the heat transfer circuit to the cold transfer circuit of the cooler, and upstream of an expansion valve provided in the cold transfer circuit of the cooler. The terms "downstream" and "upstream" here relate to the flow direction of the cold transfer medium through the cold transfer circuit of the cooler. The thermal coupling between the cold side of the Peltier element and the cold transfer circuit of the cooler can be produced by a cold plate, through which flows the cold transfer medium circulating in the cold transfer circuit of the cooler.

A hot side of the Peltier element is preferably thermally coupled to the heat transfer circuit. In particular, the hot side of the Peltier element can be thermally coupled to the heat transfer circuit downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system. The terms "downstream" and "upstream" here relate to the flow direction of the heat transfer medium through the heat transfer circuit. The thermal coupling between the hot side of the Peltier element and the heat transfer circuit can be produced by a cold plate, through which flows the heat transfer medium circulating in the heat transfer circuit.

Furthermore, a cold side of the Peltier element may be thermally coupled to a first section of the heat transfer circuit which is arranged upstream of the heat exchanger which thermally couples the heat transfer circuit to the cold transfer circuit of the cooler. The term "upstream" here relates to the flow direction of the heat transfer medium through the heat transfer circuit. The thermal coupling between the cold side of the Peltier element and the first section of the heat transfer circuit can be produced by a cold plate, through which flows the heat transfer medium flowing through the first section of the heat transfer circuit.

A hot side of the Peltier element may, by contrast, be thermally coupled to a second section of the heat transfer circuit which is arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system. The terms "downstream" and "upstream" here relate to the flow direction of the heat transfer medium through the heat transfer circuit. The thermal coupling between the hot side of the Peltier element and the second section of the heat transfer circuit can be produced by a cold plate, through which flows the heat transfer medium flowing through the second section of the heat transfer circuit.

The heat transfer arrangement of the aircraft cooling system may further be adapted to transfer waste heat generated by a heat-generating aircraft device to the cabin air extraction system. The heat-generating aircraft device may be a galley device, for example an oven, an apparatus for preparing hot drinks or any other galley device which generates waste heat in operation. All that is essential is that also the waste heat of this device does not have to be removed to the aircraft surroundings in an energy-intensive manner with the aid of the aircraft air conditioning system or an additional cooling system, but can be transferred to the cabin air extraction system by means of the heat transfer arrangement of the aircraft cooling system.

The heat-generating aircraft device may be assigned a heat exchanger which serves to transfer the waste heat of the heat-generating aircraft device to the heat transfer medium circulating in the heat transfer circuit, which medium for its part delivers its heat energy to the cabin air extraction system. The heat exchanger assigned to the cooler and the heat exchanger assigned to the heat-generating aircraft device may be arranged parallel to one another in the heat transfer circuit.

In the heat transfer circuit there may be arranged a conveying device, for example configured in the form of a pump, which conveys the heat transfer medium, heated by the waste heat of the cooler and/or the waste heat of the heat-generating aircraft device, through the heat transfer circuit. Alternatively to this, provision may also be made for a natural circulation for conveying the heat transfer medium, heated by the waste heat of the cooler and/or the waste heat of the heat-generating aircraft device, through the heat transfer circuit.

Furthermore, the heat transfer arrangement may be adapted to transfer waste heat generated by the cooler to cooled process air generated by an air conditioning unit. The air conditioning unit, which may be assigned to an aircraft air conditioning system, cools the process air, for example, to a temperature which is sufficiently low to cool in an aircraft cabin a climatic zone of the aircraft cabin with the highest thermal load to a comfortable temperature. For example, the cooled process air provided by the air conditioning unit can have a temperature of approximately 11° C. The process air preferably flows through a process air line which is adapted to conduct the process air into a working area of an aircraft cabin. The working area may be arranged, for example, in a door area of the aircraft cabin, i.e., an area of the aircraft cabin adjacent to a door. A galley, for example, may be provided in the working area.

The working area of an aircraft cabin differs from other areas of the aircraft cabin in particular in that normally there are comparatively few people in the working area. Moreover, additionally cooling energy may get into the working area via cold surfaces of cooled galley areas or of the aircraft doors. The working area therefore normally has a lower cooling requirement than other areas of the aircraft cabin, for example a Business Class area or an Economy Class area, in which there are a large number of passengers. Rather, the cooled process air provided by the air conditioning unit normally has to be heated to an elevated temperature before it is supplied into the working area of the aircraft cabin, in order to enable the creation of comfortable ambient conditions in the working area.

A heat transfer arrangement which is adapted to transfer waste heat generated by the cooler to cooled process air generated by an air conditioning unit thus ensures that the waste heat generated by the cooler can be utilized to heat the process air flowing through the process air line before it is supplied into the working area of the aircraft cabin. As a result, it is no longer necessary to provide an energy-intensive heating of the process air before it is supplied into the working area of the aircraft cabin by an additional heating device, in order to create comfortable ambient conditions in the working area of the aircraft cabin.

Furthermore, the heat transfer arrangement may be adapted to transfer waste heat generated by the cooler to air which is withdrawn from the working area of the aircraft cabin and after heating by the waste heat of the cooler is returned to the working area of the aircraft cabin again.

In a method for operating an aircraft cooling system, cooling energy is supplied, to an aircraft device to be cooled, by means of a cooler which comprises a cold transfer circuit, in which a cold transfer medium circulates. Waste heat generated by the cooler is transferred to a cabin air extraction system by means of a heat transfer arrangement. The heat transfer arrangement comprises a heat transfer circuit, in which a heat transfer medium heated by the waste heat of the cooler circulates and which is thermally coupled to the cold transfer circuit of the cooler via a heat exchanger, in order to absorb waste heat generated by the cooler. At least one heat pump is operated to increase the heat energy transfer from the cold transfer medium circulating in the cold transfer circuit of the cooler to the heat transfer medium circulating in the heat transfer circuit, at least in certain operating phases of the aircraft cooling system.

The operation of the heat pump may be controlled by a control device as a function of the temperature and/or the pressure of the cold transfer medium in the heat exchanger, which thermally couples the heat transfer circuit to the cold transfer circuit of the cooler.

The heat pump may thermally couple the heat transfer circuit to the cold transfer circuit of the cooler.

Furthermore, the heat pump may thermally couple a first section of the heat transfer circuit to a second section of the heat transfer circuit, the first section of the heat transfer circuit being able to be arranged upstream of the heat exchanger which thermally couples the heat transfer circuit to the cold transfer circuit of the cooler, and the second section of the heat transfer circuit being able to be arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

The heat pump may comprise at least one thermoelectric heat pump unit, in particular a Peltier element.

A cold side of the Peltier element is preferably thermally coupled to the cold transfer circuit of the cooler. In particular, the cold side of the Peltier element may be thermally coupled to a cold transfer circuit of the cooler downstream of the heat exchanger which thermally couples the heat transfer circuit to the cold transfer circuit of the cooler, and upstream of an expansion valve provided in the cold transfer circuit of the cooler.

A hot side of the Peltier element is preferably thermally coupled to the heat transfer circuit. In particular, the hot side of the Peltier element may be thermally coupled to the heat transfer circuit downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

Furthermore, a cold side of the Peltier element may be thermally coupled to a first section of the heat transfer circuit which may be arranged upstream of the heat exchanger which thermally couples the heat transfer circuit to the cold transfer circuit of the cooler.

A hot side of the Peltier element may also be thermally coupled to a second section of the heat transfer circuit which is arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

The heat transfer arrangement may further transfer waste heat generated by a heat-generating aircraft device to the cabin air extraction system.

Finally, the heat transfer arrangement may further transfer waste heat generated by the cooler to cooled process air generated by an air conditioning unit. The process air may flow through a process air line which conducts the process air into a working area of an aircraft cabin.

Furthermore, the heat transfer arrangement may transfer waste heat generated by the cooler to air which is withdrawn from the working area of the aircraft cabin and after heating by the waste heat of the cooler is returned to the working area of the aircraft cabin again.

BRIEF DESCRIPTION OF THE DRAWINGS

A preferred embodiment of the invention will now be explained in more detail with reference to the appended schematic drawings, of which.

DETAILED DESCRIPTION OF THE PREFERRED EMBODIMENTS

Figure 1:
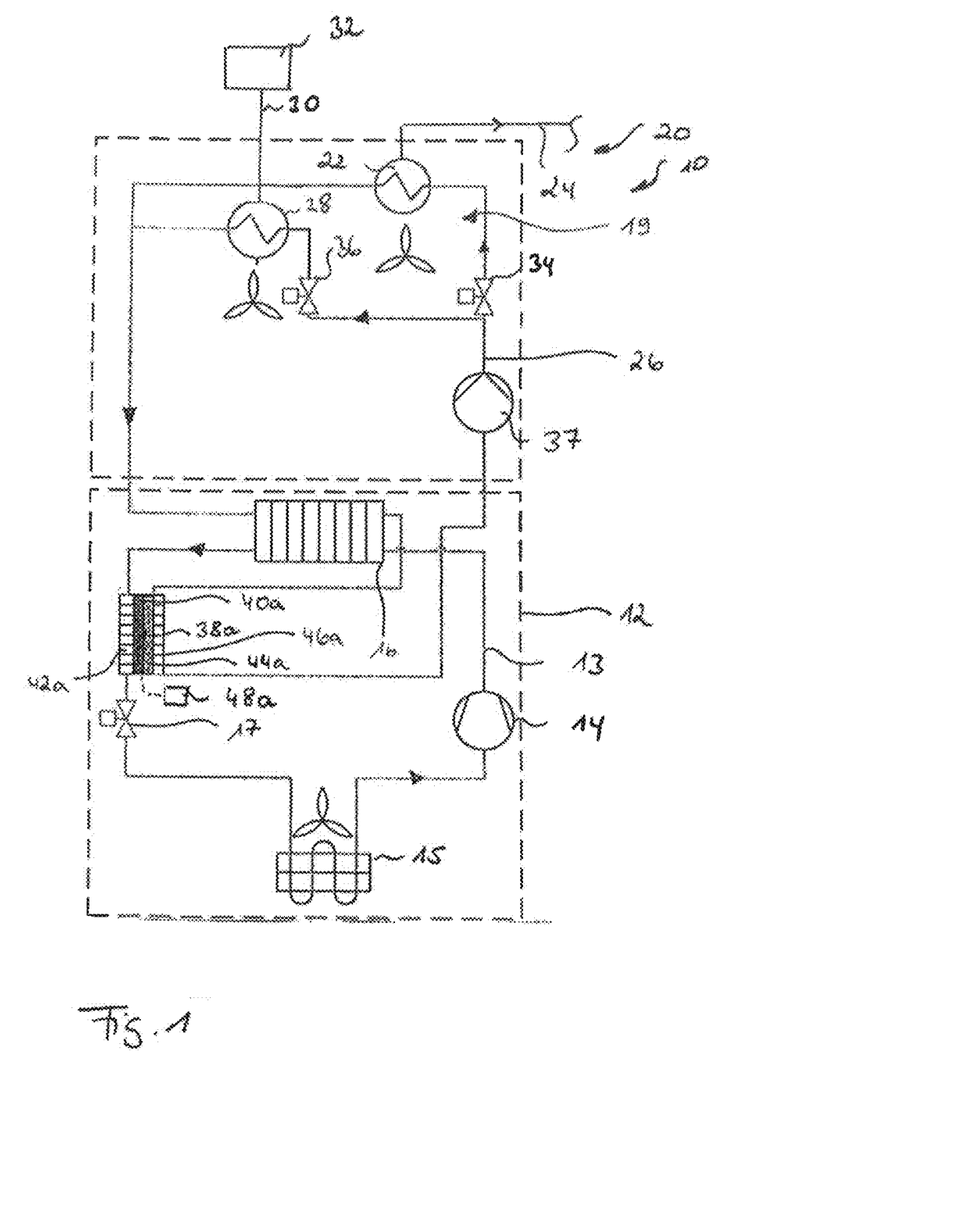
FIG. 1 shows a schematic illustration of a first embodiment of an aircraft cooling system.

An aircraft cooling system 10 illustrated in FIG. 1 comprises a cooler 12 configured in the form of an air chiller, which serves to supply cooling energy to areas of a galley to be cooled. The galley areas to be cooled may be, for example, galley compartments which serve to store food intended for distribution to the aircraft passengers. The cooler 12 comprises a cold transfer circuit 13, in which a two-phase cold transfer medium circulates. The cold transfer medium is conveyed through the cold transfer circuit 13 of the cooler 12 by means of a conveying device 14 configured in the form of a pump.

An evaporator 15 or a heat exchanger configured in the form of an evaporator is arranged in the cold transfer circuit. When flowing through the evaporator 15, the cold transfer medium circulating in the cold transfer circuit 13 of the cooler 12 delivers cooling energy to the galley areas to be cooled and in doing so is converted from the liquid to the gaseous state. A heat exchanger 16 arranged downstream of the conveying device 14 in the cold transfer circuit 13 of the cooler 12 is, by contrast, configured in the form of a condenser. When flowing through the heat exchanger 16 configured in the form of a condenser, the cold transfer medium circulating in the cold transfer circuit 13 of the cooler 12 delivers heat energy and in doing so is converted back from the gaseous to the liquid state. Finally, an expansion valve 17 is provided in the cold transfer circuit 13 of the cooler 12, which valve is arranged downstream of the heat exchanger 16 configured in the form of a condenser and upstream of the evaporator 15 in the cold transfer circuit 13 of the cooler 12.

The aircraft system 10 further comprises a heat transfer arrangement 19 which serves to transfer the waste heat, generated by the cooler 12 and delivered by means of the heat exchanger 16 configured in the form of a condenser, to a cabin air extraction system 20. The heat transfer arrangement 19 comprises a heat exchanger 22, through which flows on its cold side cabin exhaust air conducted through a cabin exhaust air line 24 of the cabin air extraction system 20. On its hot side, by contrast, a liquid heat transfer medium can flow through the heat exchanger 22, which medium circulates in a heat transfer circuit 26 which serves to remove waste heat from the cooler 12. The heat exchanger 22 of the heat transfer arrangement 19 is arranged downstream of an extractor (not illustrated specifically) in the cabin exhaust air line 24 of the cabin air extraction system 20.

The heat transfer arrangement 19 comprises a further heat exchanger 28, through which flows on its cold side the cooled process air supplied to the further heat exchanger 26 via a process air line 30. The process air is generated by an air conditioning unit 32 and conducted via the process air line 30 into a working area of the aircraft cabin. The working area of the aircraft cabin is situated, for example, adjacent to the doors of the aircraft cabin. In the working area, there may be arranged, for example, a galley. Since normally there are comparatively few people in the working area and the working area moreover is cooled by cooling energy transfer from cold surfaces of the aircraft doors and also cooled galley devices, the process air flowing through the process air line has to be heated to a higher temperature before being supplied into the working area, in order to enable comfortable ambient temperatures to be set in the working area.

On its hot side, the liquid heat transfer medium can therefore flow through the further heat exchanger 28, which medium circulates in a heat transfer circuit 26. As a result, the waste heat removed from the cooler 12 via the heat transfer circuit 26 can be utilized to heat the process air flowing through the process air line 30 before being supplied into the working area of the aircraft cabin. The supply of heat transfer medium from the heat transfer circuit 26 to the heat exchanger 22 and the further heat exchanger 28 can be controlled as desired by appropriate control of two valves 34, 36.

A conveying device 37, which is configured in the form of a pump and is arranged in the heat transfer circuit 26, serves to convey the heat transfer medium through the heat transfer circuit 26. Alternatively to this, provision may also be made for a natural circulation for conveying the heat transfer medium through the heat transfer circuit 26. The transfer of the waste heat from the cooler 12 to the heat transfer medium circulating through the heat transfer circuit 26 is effected by means of the heat exchanger 16 configured in the form of a condenser.

Finally, the aircraft cooling system 10 comprises a heat pump 38a which is adapted to bring about an increase of the heat energy transfer from the cold transfer medium circulating in the cold transfer circuit 13 of the cooler 12 to the heat transfer medium circulating in the heat transfer circuit 26, at least in certain operating phases of the aircraft cooling system 10. In the aircraft cooling system 10 illustrated in FIG. 1, the heat pump 38a is integrated in the cooler 12 and adapted, in operation, to thermally couple the heat transfer circuit 26 to the cold transfer circuit 13 of the cooler 12. Through the operation of the heat pump 38a, a further thermal coupling of the heat transfer circuit 26 of the heat transfer arrangement 19 to the cold transfer circuit 13 of the cooler 12 is thus produced, via which, if required, additional heat which is not already transmitted, by the thermal coupling of the heat transfer circuit 26 of the heat transfer arrangement 19 to the cold transfer circuit 13 of the cooler 12 by means of the heat exchange 16, from the cold transfer medium circulating in the cold transfer circuit 13 of the cooler 12 to the heat transfer medium circulating in the heat transfer circuit 26, can be transferred from the cold transfer medium circulating in the cold transfer circuit 13 of the cooler 12 to the heat transfer medium circulating in the heat transfer circuit 26.

The heat pump 38a comprises a Peltier element or is configured in the form of a Peltier element. A cold side 40a of the Peltier element is thermally coupled via a cold plate 42a to the cold transfer circuit 13 of the cooler 12. In particular, the cold side 40a of the Peltier element is thermally coupled to the cold transfer circuit 13 of the cooler 12 downstream of the heat exchanger 16 configured in the form of a condenser, which thermally couples the heat transfer circuit 26 to the cold transfer circuit 13 of the cooler 12, and upstream of the expansion valve 17 provided in the cold transfer circuit 13 of the cooler 12.

A hot side 44a of the Peltier element is, by contrast, thermally coupled via a cold plate 46a to the heat transfer circuit 26. In particular, the hot side 44a of the Peltier element is thermally coupled to the heat transfer circuit 26 downstream of the heat exchanger 16 configured in the form of a condenser, which thermally couples the heat transfer circuit 26 to the cold transfer circuit 13 of the cooler 12, and upstream of the heat exchanger 22 which serves to bring the heat transfer medium heated by the waste heat of the cooler 12 into thermal contact with the cabin exhaust air flowing through the cabin exhaust air line 24 of the cabin air extraction system 20.

The operation of the heat pump 38a is controlled by means of a control device 48a likewise integrated in the cooler 12. Appropriate signals are transmitted to the control device 48a by sensors (not illustrated specifically in FIG. 1), which are characteristic of the temperature and/or the pressure of the cold transfer medium in the heat exchanger 16 which thermally couples the heat transfer circuit 26 to the cold transfer circuit 13 of the cooler 12. The control device 48a controls the operation of the heat pump 38a, while taking account of these sensor signals.

In particular, the control device 48a controls the operation of the heat pump 38a in such a manner that the heat pump 38a is put into operation when, when the temperature of the cold transfer medium in the heat exchanger 16 exceeds a predetermined threshold value and/or the pressure of the cold transfer medium in the heat exchanger 16 falls below a predetermined threshold value. Furthermore, the control device 48a can control the operation of the heat pump 38a in such a manner that the temperature and/or the pressure of the cold transfer medium in the heat exchanger 16 is/are maintained in a predetermined range of values. As a result, an adequate performance of the aircraft cooling system 10 can be ensured even in difficult conditions, for example when an aircraft equipped with the aircraft cooling system 10 is on the ground on hot days.

Figure 2:
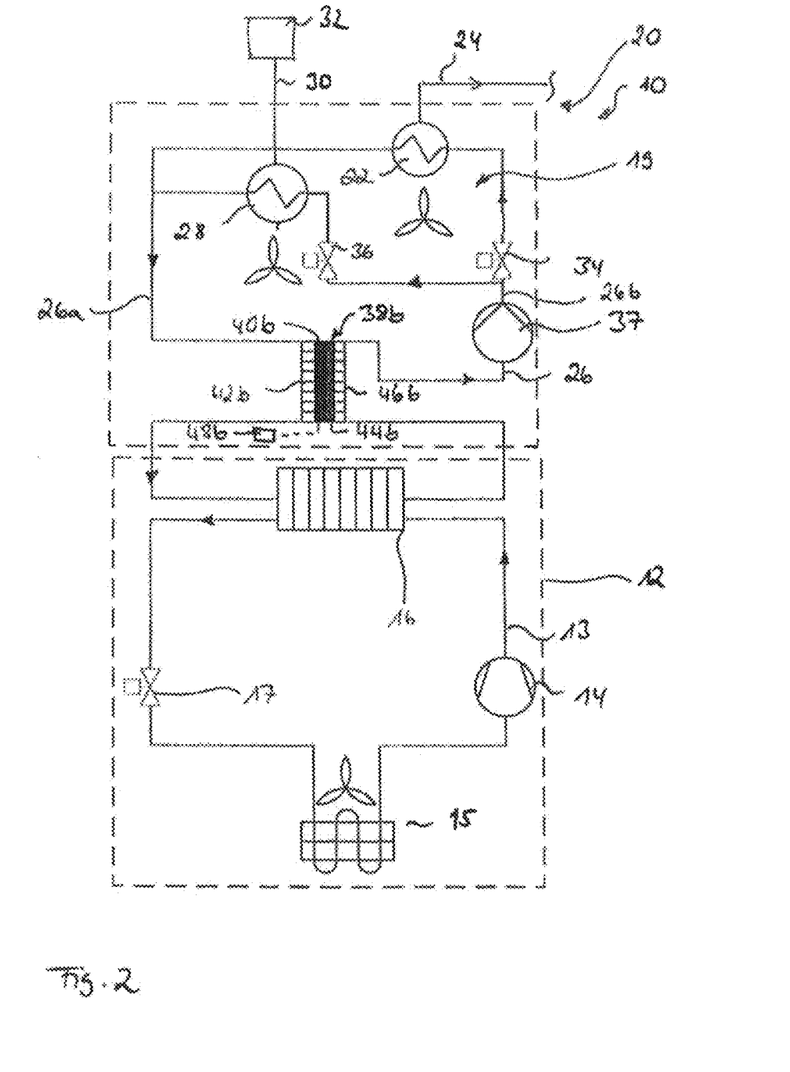
FIG. 2 shows a schematic illustration of a second embodiment of an aircraft cooling system.

The embodiment of an aircraft cooling system 10 shown in FIG. 2 differs from the arrangement according to FIG. 1 in that the heat pump 38a, which is adapted, in operation, to thermally couple the heat transfer circuit 26 to the cold transfer circuit 13 of the cooler 12, has been dispensed with. Instead, the aircraft cooling system 10 is equipped with a heat pump 38b which is formed separately from the cooler 12 and is adapted to thermally couple a first section 26a of the heat transfer circuit 26 to a second section 26b of the heat transfer circuit 26. The first section 26a of the heat transfer circuit 26 is arranged upstream of the heat exchanger 16 which thermally couples the heat transfer circuit 26 to the cold transfer circuit 13 of the cooler 12. The second section 26b of the heat transfer circuit 26 is, by contrast, arranged downstream of the heat exchanger 16 which thermally couples the heat transfer circuit 26 to the cold transfer circuit 13 of the cooler 12, and upstream of the heat exchanger 22 which is adapted to bring the heat transfer medium heated by the waste heat of the cooler 12 into thermal contact with cabin exhaust air flowing through a cabin exhaust air line 24 of the cabin air extraction system 20.

The heat pump 38b comprises, again, a Peltier element or is configured in the form of a Peltier element. A cold side 40b of the Peltier element is thermally coupled to the first section 26a of the heat transfer circuit 26 via a cold plate 42b. A hot side 44b of the Peltier element is, by contrast, thermally coupled to a second section 26b of the heat transfer circuit 26.

In such a configuration of the aircraft cooling system 10, through the operation of the heat pump 38b, heat energy can be transmitted from the heat transfer medium, flowing through the heat transfer circuit 26 upstream of the heat exchanger 16 coupling the heat transfer circuit 26 to the cold transfer circuit 13, to the heat transfer medium flowing through the heat transfer circuit 26 downstream of the heat exchanger 16 coupling the heat transfer circuit 26 to the cold transfer circuit 13. As a result, the temperature of the heat transfer medium flowing through the second section 26b of the heat transfer circuit 26 before delivering its heat energy to the cabin air extraction system 20, and consequently the temperature difference between the temperature of the heat transfer medium flowing through the second section 26b of the heat transfer circuit 26 before delivering its heat energy to the cabin air extraction system 20 and the temperature of the cabin exhaust air serving as a heat sink is increased.

Simultaneously, the temperature of the heat transfer medium flowing through the first section 26a of the heat transfer circuit 26 is reduced, so that the heat transfer medium can be supplied to the heat exchanger 16, which thermally couples the heat transfer circuit 26 to the cold transfer circuit 13 of the cooler 12, at a lower temperature. When flowing through the heat exchanger 16, the heat transfer medium can then absorb more heat energy from the cold transfer medium circulating in the cold transfer circuit 13 of the cooler 12.

The operation of the heat pump 38b is controlled by a control device 48b, as described above in connection with the control of the heat pump 38a by the control device 48a. Otherwise, the construction and functioning of the aircraft cooling system 10 shown in FIG. 2 correspond to the construction and functioning of the system according to FIG. 1.

Figure 3:
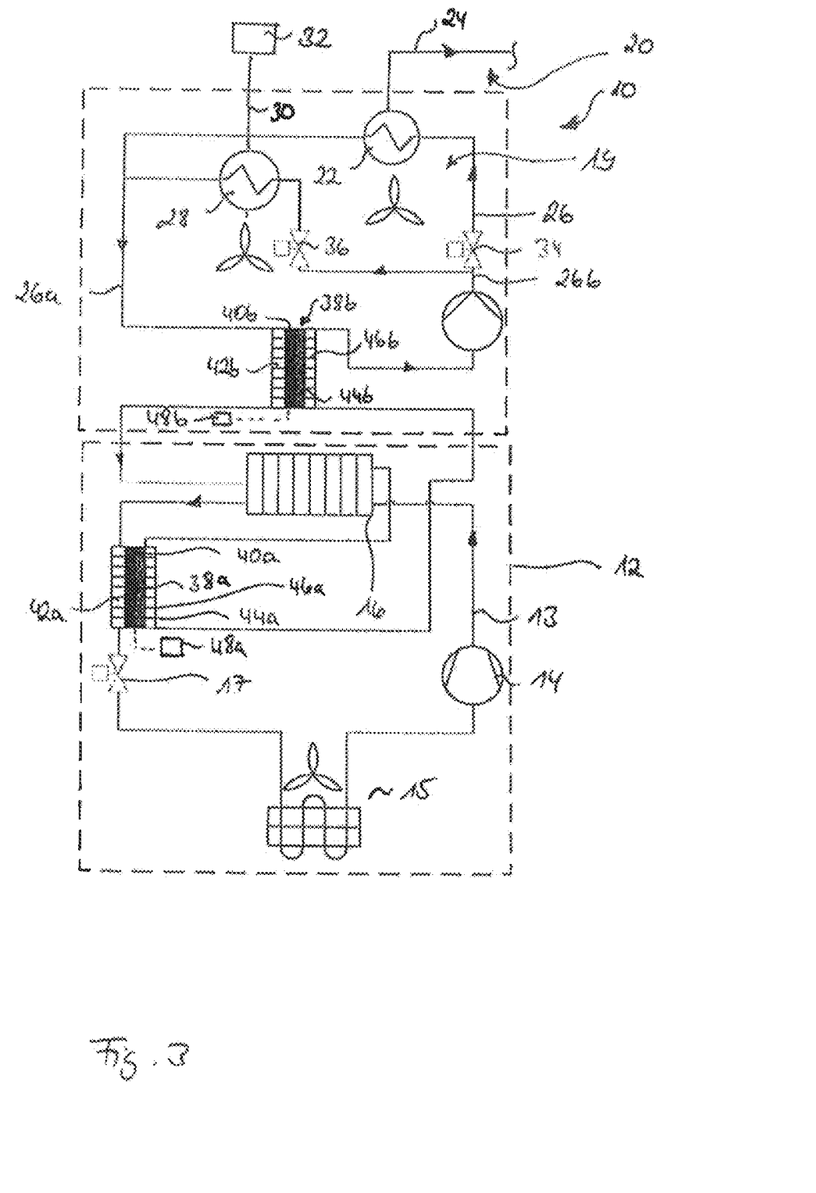
FIG. 3 shows a schematic illustration of a third embodiment of an aircraft cooling system.

Finally, the embodiment of an aircraft cooling system 10 shown in FIG. 3 differs from the arrangement according to FIG. 1 in that the aircraft cooling system 10 comprises, besides a heat pump 38a, as described above in connection with the aircraft cooling system 10 according to FIG. 1, additionally also a heat pump 38b, as described above in connection with the aircraft cooling system 10 according to FIG. 2. Otherwise, the construction and functioning of the aircraft cooling system 10 shown in FIG. 3 correspond to the construction and functioning of the system according to FIG. 1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cooling system comprising:
   a cooler comprising a cold transfer circuit, in which a cold transfer medium circulates, and which is adapted to supply cooling energy to an aircraft device to be cooled, and a heat transfer arrangement comprising a heat transfer circuit, in which a heat transfer medium circulates and which is thermally coupled to the heat transfer circuit of the cooler via a heat exchanger, in order to absorb waste heat generated by the cooler and transfer it to a cabin air extraction system, the heat transfer arrangement further comprising at least one heat pump which is adapted to bring about an increase of the heat energy transfer from the cold transfer medium circulating in the cold transfer circuit of the cooler to the heat transfer medium circulating in the heat transfer circuit, at least in certain operating phases of the aircraft cooling system.

2. The aircraft cooling system according to claim 1, further comprising a control device which controls the operation of the heat pump as a function of at least one of a temperature and a pressure of the cold transfer medium in the heat exchanger, which thermally couples the heat transfer circuit to the cold transfer circuit of the cooler.

3. The aircraft cooling system according to claim 1, wherein the heat pump thermally couples the heat transfer circuit to the cold transfer circuit of the cooler.

4. The aircraft cooling system according to claim 1, wherein the heat pump thermally couples a first section of the heat transfer circuit to a second section of the heat transfer circuit, the first section of the heat transfer circuit being arranged upstream of the heat exchanger which thermally couples the heat transfer circuit to the cold transfer circuit of the cooler, and the second section of the heat transfer circuit being arranged downstream of the heat exchanger which thermally couples the heat transfer circuit to the cold transfer circuit of the cooler, and upstream of a heat exchanger which brings the heat transfer medium heated by the waste heat of the cooler into thermal contact with cabin exhaust air flowing through a cabin exhaust air line of the cabin air extraction system.

5. The aircraft cooling system according to claim 1, wherein the heat pump comprises at least one Peltier element.

6. The aircraft cooling system according to claim 5, wherein a cold side of the Peltier element is thermally coupled to a cold transfer circuit of the cooler downstream of the heat exchanger which thermally couples the heat transfer circuit to the cold transfer circuit of the cooler, and upstream of an expansion valve provided in the cold transfer circuit of the cooler.

7. The aircraft cooling system according to claim 5, wherein a hot side of the Peltier element is thermally coupled to the heat transfer circuit downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

8. The aircraft cooling system according to claim 5, wherein a cold side of the Peltier element is thermally coupled to a first section of the heat transfer circuit which is arranged upstream of the heat exchanger which thermally couples the heat transfer circuit to the cold transfer circuit of the cooler.

9. The aircraft cooling system according to claim 5, wherein a hot side of the Peltier element is thermally coupled to a second section of the heat transfer circuit which is arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

10. The aircraft cooling system according to claim 1, wherein the heat transfer arrangement is further adapted to transfer waste heat generated by the cooler to cooled process air generated by an air conditioning unit which flows through a process air line which is adapted to conduct the process air into a working area of an aircraft cabin.

11. A method for operating an aircraft cooling system comprising the steps:

supplying cooling energy, to an aircraft device to be cooled, by means of a cooler which comprises a cold transfer circuit, in which a cold transfer medium circulates, and transferring waste heat generated by the cooler to a cabin air extraction system by means of a heat transfer arrangement which comprises a heat transfer circuit, in which a heat transfer medium circulates and which is thermally coupled to the cold transfer circuit of the cooler via a heat exchanger, wherein, in order to absorb waste heat generated by the cooler, at least one heat pump of the heat transfer arrangement is operated to increase the heat energy transfer from the cold transfer medium circulating in the cold transfer circuit of the cooler to the heat transfer medium circulating in the heat transfer circuit, at least in certain operating phases of the aircraft cooling system.

12. The method according to claim 11, wherein the operation of the heat pump is controlled by a control device as a function of at least one of a temperature and a pressure of the cold transfer medium in the heat exchanger, which thermally couples the heat transfer circuit to the cold transfer circuit of the cooler.

13. The method according to claim 11, wherein the heat pump thermally couples the heat transfer circuit to the cold transfer circuit of the cooler.

14. The method according to claim 11, wherein the heat pump thermally couples a first section of the heat transfer circuit to a second section of the heat transfer circuit, the first section of the heat transfer circuit being arranged upstream of the heat exchanger which thermally couples the heat transfer circuit to the cold transfer circuit of the cooler, and the second section of the heat transfer circuit being arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

15. The method according to claim 11, wherein the heat pump comprises at least one Peltier element.

16. The method according to claim 15, wherein a cold side of the Peltier element is thermally coupled to a cold transfer circuit of the cooler downstream of the heat exchanger which thermally couples the heat transfer circuit to the cold transfer circuit of the cooler, and upstream of an expansion valve provided in the cold transfer circuit of the cooler.

17. The method according to claim 15, wherein a hot side of the Peltier element is thermally coupled to the heat transfer circuit downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

18. The method according to claim 15, wherein a cold side of the Peltier element is thermally coupled to a first section of the heat transfer circuit which is arranged upstream of the heat exchanger which thermally couples the heat transfer circuit to the cold transfer circuit of the cooler.

19. The method according to claim 15, wherein a hot side of the Peltier element is thermally coupled to a second section of the heat transfer circuit which is arranged downstream of the heat exchanger which thermally couples the heat transfer circuit to the cold transfer circuit of the cooler, and upstream of a heat exchanger which is adapted to bring the heat transfer medium heated by the waste heat of the cooler into thermal contact with cabin exhaust air flowing through a cabin exhaust air line of the cabin air extraction system.

20. The method according to claim 11, wherein the heat transfer arrangement further transfers waste heat generated by the cooler to cooled process air generated by an air conditioning unit which flows through a process air line which conducts the process air into a working area of an aircraft cabin.

\* \* \* \* \*